(12) United States Patent
Iwata et al.

(10) Patent No.: US 7,038,676 B2
(45) Date of Patent: May 2, 2006

(54) SYSTEM AND METHOD FOR DATA COMPRESSION

(75) Inventors: Eiji Iwata, Austin, TX (US); Masakazu Suzuoki, Tokyo (JP)

(73) Assignee: Sony Computer Entertainmant Inc., (JP)

( * ) Notice: Subject to any disclaimer, the term of this patent is extended or adjusted under 35 U.S.C. 154(b) by 283 days.

(21) Appl. No.: 10/167,328

(22) Filed: Jun. 11, 2002

(65) Prior Publication Data

US 2003/0229719 A1    Dec. 11, 2003

(51) Int. Cl.
 G06F 17/00 (2006.01)
 G09G 5/00 (2006.01)
 G06T 13/00 (2006.01)

(52) U.S. Cl. .................. 345/418; 345/473; 345/474; 345/619

(58) Field of Classification Search ............... 345/506, 345/418, 427, 473, 474, 555, 619; 348/699, 348/402.1, 413.1, 416.1, 412.1; 375/240.14, 375/240.16; 382/197, 236
See application file for complete search history.

(56) References Cited

U.S. PATENT DOCUMENTS

| | | | |
|---|---|---|---|
| 5,742,289 A * | 4/1998 | Naylor et al. | 345/419 |
| 5,786,860 A | 7/1998 | Kim et al. | |
| 5,825,423 A * | 10/1998 | Jung | 375/240.14 |
| 5,896,176 A * | 4/1999 | Das et al. | 375/240.15 |
| 2001/0040924 A1* | 11/2001 | Hori et al. | 375/240.16 |

FOREIGN PATENT DOCUMENTS

| | | |
|---|---|---|
| EP | 0675462 | 10/1995 |
| JP | 08305895 | 11/1996 |

OTHER PUBLICATIONS

Zhaohui Sun, et al.: "Parametric Motion Modeling Based on Trilinear Constraints for Object-Based Video Compression," Acoustics, Speech and Signal Processing, 1998, Proceedings of the 1998 IEEE International Conference on Seattle, WA, USA May 12-15, 1998, New York, NY, USA, IEEE, US, pp. 2593-2596.

Ilmi Yoon, et al., "Compression of Computer Graphics Images With Image-Based Rendering," Multimedia Computing and Networking 1999, San Jose, CA, USA, Jan. 25-27, 1999, vol. 3654, pp. 66-75.

\* cited by examiner

*Primary Examiner*—Matthew C. Bella
*Assistant Examiner*—Hau Nguyen
(74) *Attorney, Agent, or Firm*—Lerner, David, Littenberg, Krumholz & Mentlik, LLP (57) ABSTRACT

A system and method for compressing video graphics data are provided. The system and method include generating in a graphics pipeline, from video graphics data modeling objects, vertex data corresponding to the objects, rendering the video graphics data to produce a current frame of pixel data and a reference frame of pixel data, and, based upon the vertex data, defining a search area within the reference frame for calculating a motion vector for a block of pixel data within the current frame. The current frame then is compressed using the motion vector. The use of vertex data from the graphics pipeline to define the search area substantially reduces the amount of searching necessary to generate motion vectors and perform data compression.

59 Claims, 5 Drawing Sheets

SYSTEM AND METHOD FOR DATA COMPRESSION

FIELD OF THE INVENTION

The present invention relates to a system and method for compressing data, and more particularly, to a system and method for compressing graphics data generated by a computer.

BACKGROUND OF THE INVENTION

The preparation, storage and transmission of video data, and, in particular, video graphics data generated by a computer (for example, video graphics data for a computer game), require extensive computer resources and broadband network connections. These requirements are particularly severe when such data are transmitted in real time among a group of individuals connected over a local area network or a wide area network such as the Internet. Such transmitting occurs, for example, when video games are played over the Internet. Such playing, moreover, is becoming increasingly popular.

In order to reduce the amount of network capacity and computer resources required for the transmission of video data, various encoding schemes for data compression are employed. These data compression schemes include various versions of the MPEG (Motion Picture Experts Group) encoding standard, for example, MPEG-1, MPEG-2 and MPEG-4, and others. These data compression schemes reduce the amount of image information required for transmitting and reproducing motion picture sequences by eliminating redundant and non-essential information in the sequences.

For example, the only difference in many cases between two adjacent frames in a motion picture sequence is the slight shifting of certain blocks of pixels. Large blocks of pixels, representing, for example, regions of sky, walls and other stationary objects, often do not change at all between consecutive frames. Compression algorithms such as MPEG exploit this temporal redundancy to reduce the amount of data transmitted or stored for each frame.

Figure 1:
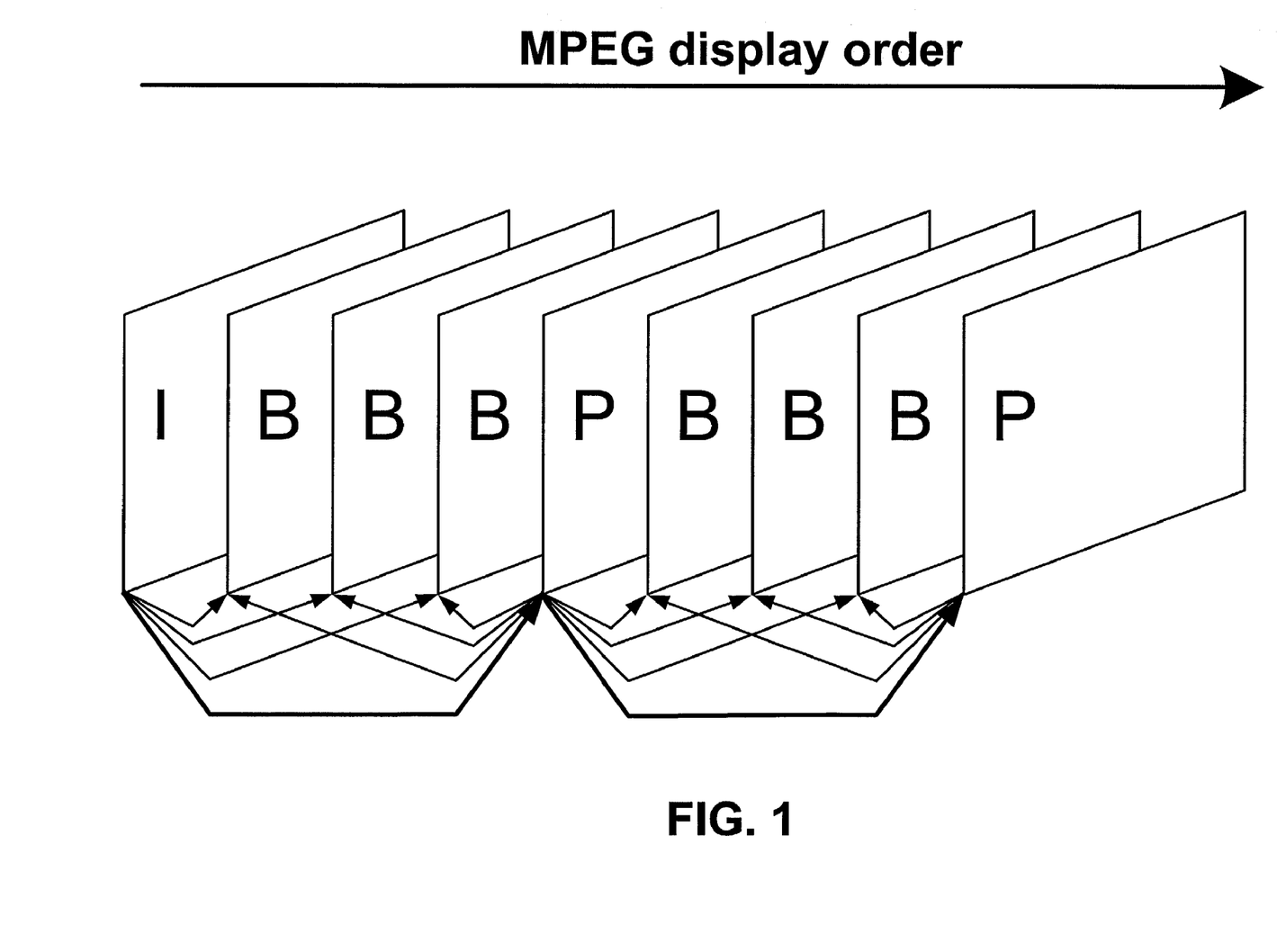
FIG. 1 is a schematic diagram of the I-frames, B-frames and P-frames of the MPEG compression scheme.

For example, in the MPEG standard, three types of frames are defined, namely, intra frames (I-frames), predicted frames (P-frames) and bi-directionally interpolated frames (B-frames). As illustrated in FIG. 1, I-frames are reference frames for B-frames and P-frames and are only moderately compressed. P-frames are encoded with reference to a previous frame. The previous frame can be either an I-frame or a P-frame. B-frames are encoded with reference to both a previous frame and a future frame. The reference frames for B-frames also can be either an I-frame or a P-frame. B-frames are not used as references.

Figure 2:
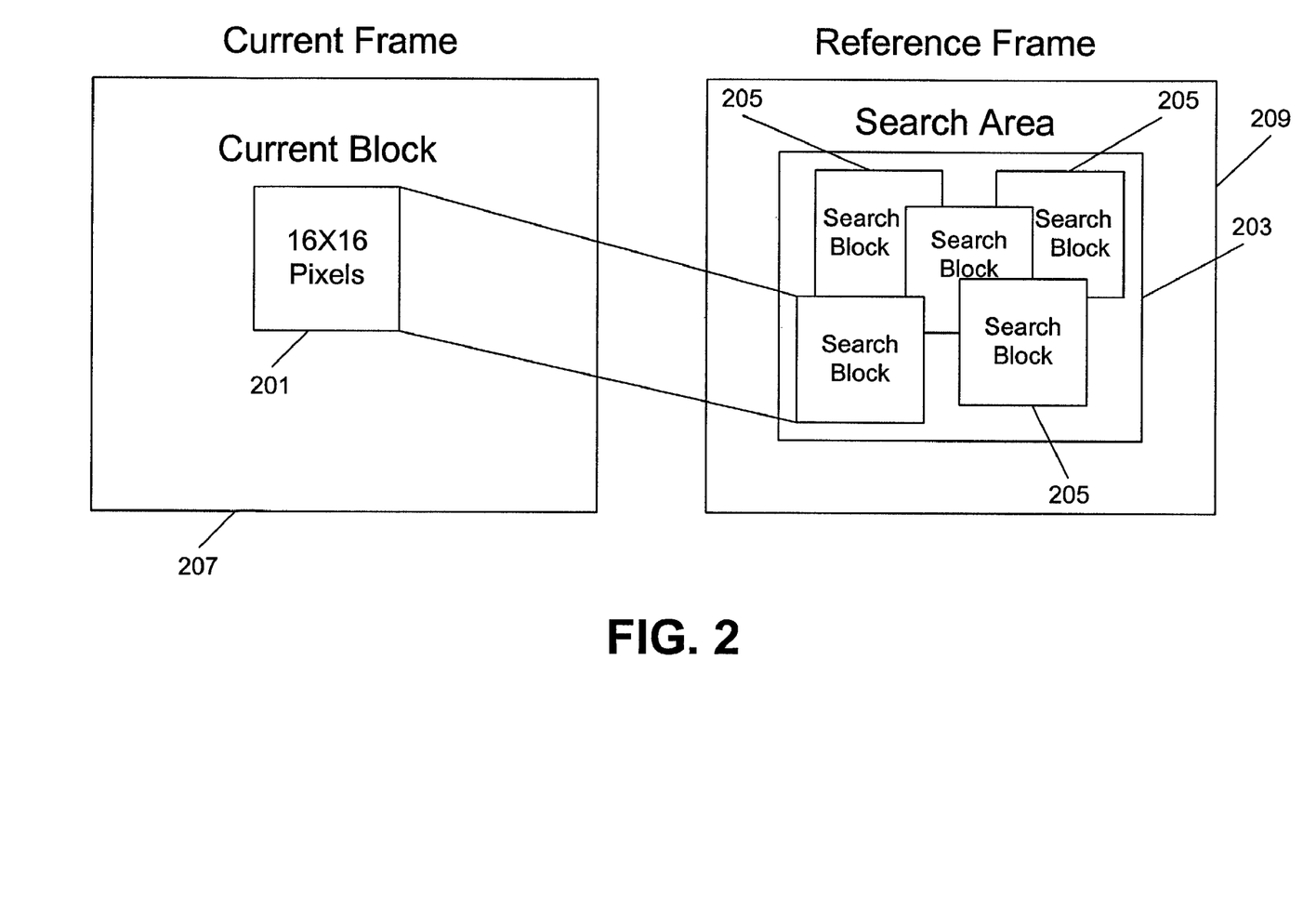
FIG. 2 is a schematic diagram of the searching steps of a motion estimation algorithm to predict a current frame from a reference frame.

In order to encode predicted frames and interpolated frames from reference frames, the MPEG scheme uses various motion estimation algorithms. These motion estimation algorithms include full search algorithms, hierarchical searching algorithms and telescopic algorithms. As illustrated in FIG. 2, under the MPEG standard, each frame typically is divided into blocks of 16 by 16 pixels called a macro block. A macro block of a current frame is encoded using a reference frame by estimating the distance that the macro block moved in the current frame from the block's position in the reference frame. The motion estimation algorithm performs this estimating by comparing each macro block of the current frame to macro blocks within a search area of the reference frame to find the best matching block in the reference frame. For example, for macro block 201 of current frame 207, a comparison is made within search area 203 of reference frame 209 between macro block 201 of the current frame and each macro block 205 of the reference frame to find the best matching block in the reference frame. The position of this best matching macro block within the reference frame then is used to calculate a motion vector for macro block 201 of the current frame. Rather than transmit for current frame 207 all of the video data corresponding to macro block 201, only the motion vector is transmitted for this block. In this way, the video data for the current block are compressed.

Executing motion estimation algorithms, however, also requires substantial computer resources. Since each macro block of a current frame must be compared to numerous macro blocks of one or more reference frames, an extensive number of computations are required. For example, the three-step-search algorithm (TSS) (a hierarchical algorithm) evaluates matches at a center location and eight surrounding locations of a search area. The location that produces the smallest difference then becomes the center of the next search area to reduce the search area by one-half. This sequence is repeated three times.

A need exists, therefore, for a more efficient and effective method for compressing video graphics data, particularly in view of the increasing demand for systems capable of playing video games in real time over the Internet and other networks.

SUMMARY OF THE INVENTION

Data compression encoders, such as MPEG encoders, employ the same method for compressing video data regardless of the source of the video data. Video data from a live performance recorded by a digital camera and simulated video data generated by a computer, therefore, are compressed in accordance with the same data compression scheme and motion estimation algorithm. When video data are generated by a computer, however, information regarding the nature and movement of objects are known prior to the data's encoding and compression. Unlike present data compression encoders, the present invention takes advantage of this information to reduce the computational steps necessary to perform data compression.

In one aspect, the present invention provides a method for compressing video data. The method includes generating in a graphics pipeline, from video graphics data modeling objects, vertex data corresponding to the objects. The method further includes rendering the video graphics data to produce a current frame of pixel data and a reference frame of pixel data. The method also includes defining, based upon the vertex data, a search area within the reference frame for calculating a motion vector for a block of pixel data within the current frame.

The objects preferably include movable objects, and the block preferably contains at least a portion of one of the movable objects. The method preferably further includes defining the search area based upon the viewport coordinates of vertexes corresponding to the one movable object within the reference frame. The search area preferably surrounds the one movable object within the reference frame and is rectangular in shape. The method preferably also includes compressing the current frame in the MPEG format based upon the motion vector.

The method also preferably includes defining, independently of the vertex data, a second search area for calculating a motion vector for a second block of pixel data within the current frame. The second block of pixel data contains no movable objects. In addition, the method also preferably includes in the graphics pipeline performing geometrical transformations upon the video graphics data, clipping the video graphics data against a view volume, projecting the video graphics data onto a projection plane and transforming the video graphics data into a viewport. The video graphics data preferably is associated with a video game, and both the current frame and the reference frame preferably are transmitted over a network such as the Internet.

In another aspect, the present invention provides a system for compressing video data. The system includes a first processor adapted to generate in a graphics pipeline, from video graphics data modeling objects, vertex data corresponding to the objects and to render the video graphics data to produce a current frame of pixel data and a reference frame of pixel data. The system further includes a second processor adapted to define, based upon the vertex data, a search area within the reference frame and to calculate a motion vector for a block of pixel data within the current frame.

DETAILED DESCRIPTION OF THE PREFERRED EMBODIMENTS

Figure 3:
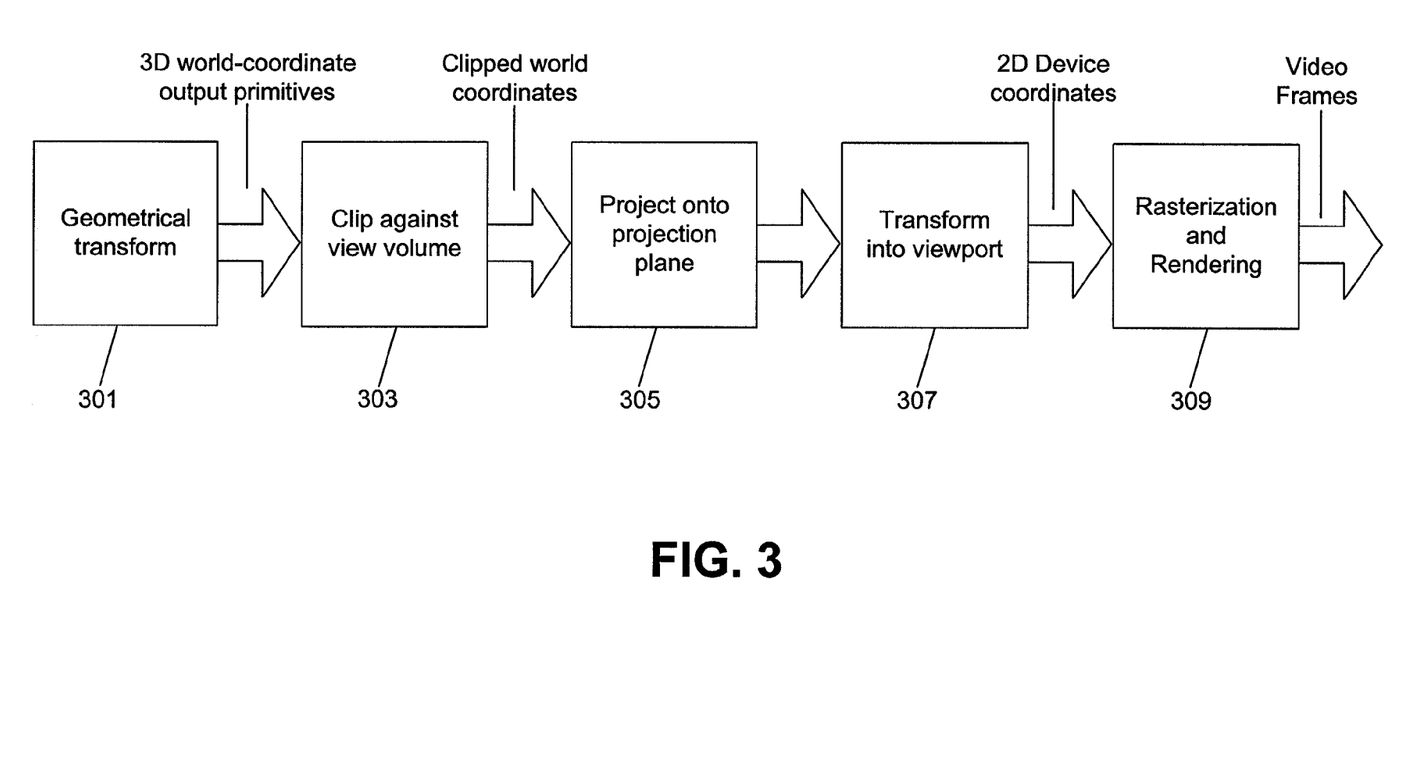
FIG. 3 is a schematic diagram of the steps of a graphics pipeline performed by a computer system in generating video graphics data.

FIG. 3 is a schematic diagram of a graphics pipeline for generating frames of video graphics data such as that displayed during a computerized simulation of a video game. The functions of this graphics pipeline may be implemented in hardware, software or any combination of the two. For example, these functions may be executed by a programmed processor such as a microprocessor, a hardwired digital circuit, an application specific integrated circuit (ASIC) or other digital circuits or software. These devices may be implemented as integrated circuits on one or more semiconductor chips. The software may be stored in a ROM, EPROM, EEPROM, magnetic disk, optical disk or any other suitable storage medium. The hardware and software may be part of a game machine, server computer, desktop computer, handheld computer, portable computer, settop box or other computing device. The computer system may be a stand-alone device or connected to a network such as the Internet.

The graphics pipeline illustrated in FIG. 3 includes a database (not shown) of graphics data modeling movable objects and stationary objects in a Cartesian coordinate system (x,y,z) known as the world coordinate system. Movable objects include all or portions of characters, vehicles, projectiles and other objects capable of moving during the computerized simulation. Stationary objects include all or portions of terrain, buildings and other objects that remain in a fixed position with respect to the world coordinate system during the simulation. This world of movable and stationary objects provides the raw data for the graphics pipeline from which the computerized simulation is effected. The modeling comprises representing each object in the database using a group of fundamental building blocks known as primitives. These primitives generally comprise triangles, squares and other polygons. The database includes the world coordinates for the vertexes of the primitives corresponding to each object and information associated with each vertex such as lighting, shading, color and texture.

During a computerized video simulation based upon the graphics data in the database, such as, for example, the playing of a video game, the programmed progression of the simulation and input from the user causes the movable objects modeled within the world coordinate system to move and the user's direction of view into, and distance from, the objects to change. In order to appropriately display the objects to the user on a display screen, the computer system executing the steps of the graphics pipeline, at functional block 301, performs geometrical transformations upon the objects in real time. These geometrical transformations include translation, scaling and rotation and can be performed in most cases by multiplying two M-matrices.

A translation involves adding a value to the x, y and z coordinates of each vertex of an object. As a result, the object is moved within the world coordinate system without spinning. Scaling involves changing the object's size without changing the object's location or orientation. An object's size can be changed by, for example, applying a factor to each of the object's vertexes to scale the distance between these vertexes and a predefined center point. A rotation turns each vertex of the object around an axis of rotation without sliding the object.

At functional block 303, the computer system clips the geometrically transformed primitives with respect to a viewing volume. This viewing volume generally is a six-sided frustum with left and right sides defining the horizontal field of view, top and bottom sides defining the vertical field of view and near and far sides defining the closest and farthest visible distances. Objects, or portions of objects, not within the viewing volume are discarded.

At functional block 305, the computer system projects the objects within the viewing volume onto a two-dimensional projection plane. This projection plane is perpendicular to the viewer's direction of view into the world coordinate system and, therefore, also is called the view plane. This step involves mapping each vertex of the three-dimensional objects onto the two-dimensional projection plane using perspective or parallel projection techniques. For example, if x',y',z' represent the coordinates of a transformed world coordinate system in which z' is perpendicular to the projection plane and x' and y' are within the projection plane, this step involves dividing the values of x' and y' for each of the objects' vertexes by the value of z'. By doing so, the object is flattened onto the projection plane such that distant objects appear smaller and near objects appear larger.

At functional block 307, the computer system transforms the objects into the viewport. The viewport is the physical area of a computer screen, television screen or other display device (not shown) used to view the computerized simulation. This transformation involves final scaling of the objects between the x',y' coordinate system of the projection plane and the x",y" coordinate system of the viewport.

As a final matter, at functional block 309, the computer system performs rasterization and rendering of the objects to generate video frames of pixel data. Rasterization and rendering of the objects involve defining the first and last pixel of each scan line falling within each primitive of each object, defining the pixels between these first and last pixels and generating for all of these pixels lighting, coloring, shading, texturing and blending information. The final pixel data are stored in a frame buffer (not shown) for use in displaying the video frames on the display screen. The final pixel data also may be compressed and stored or transmitted over a network to another computer system for display.

As a result of the steps performed in the graphics pipeline of FIG. 3, each vertex x,y,z of the primitives corresponding to each object in the three-dimensional world coordinate system is transformed to a vertex x",y" of the display screen's two-dimensional coordinate system, and the pixels corresponding to these primitives are rasterized and rendered.

Figure 4:
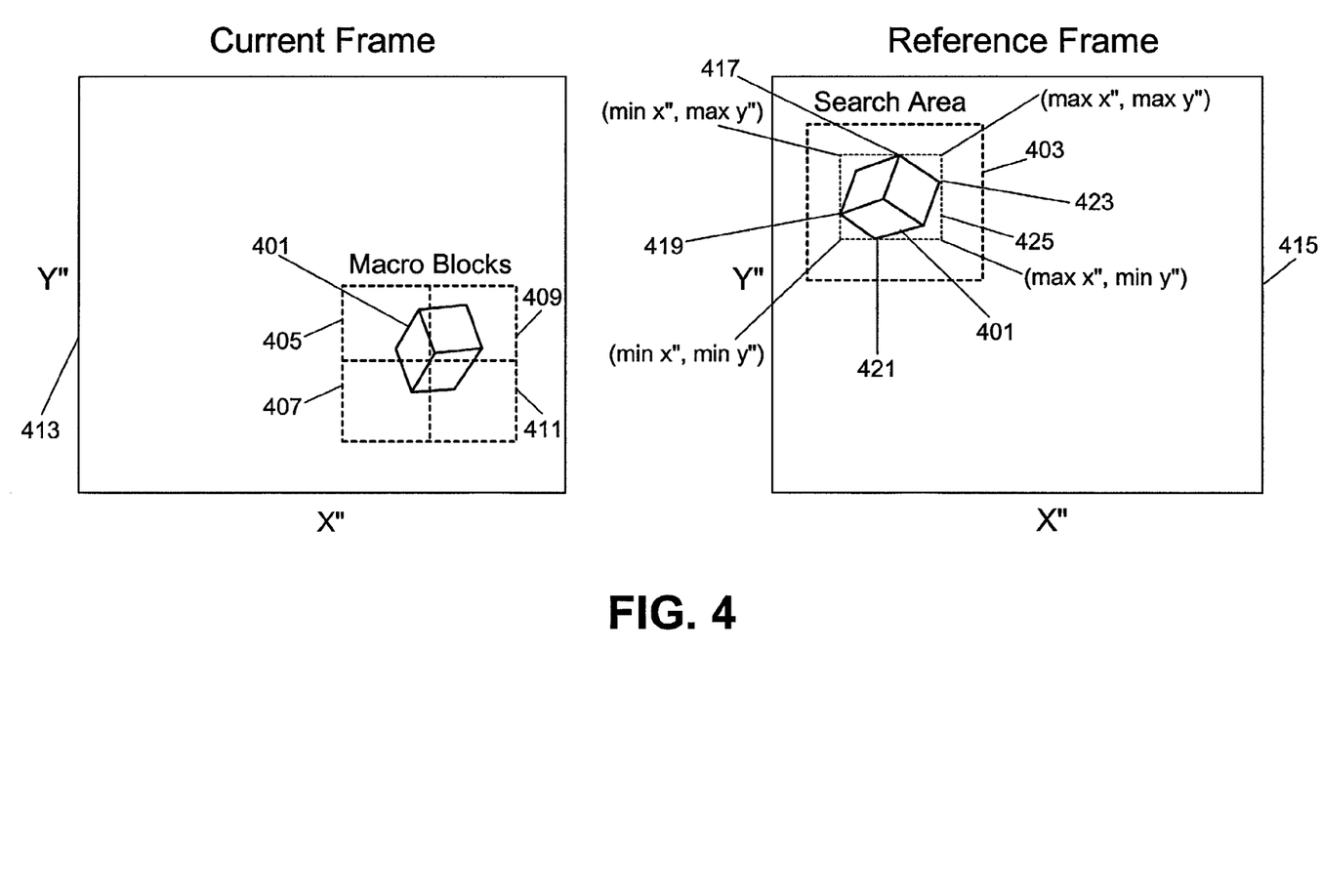
FIG. 4 is a schematic diagram of the searching steps of a motion estimation algorithm in accordance with the present invention.

An embodiment of the present invention for compressing and transmitting rasterized and rendered pixel data is illustrated in FIG. 4. Current frame 413 and reference frame 415 are two frames of pixel data from a computerized simulation. Current frame 413 is to be compressed based upon reference frame 415 in accordance with a data compression scheme, for example, the MPEG standard. The position of pixels within current frame 413 and reference frame 415 is identified by the x",y" coordinates of the viewport. As shown in FIG. 4, movable object 401 is located in the lower right portion of current frame 413 within macro blocks 405, 407, 409 and 411. In reference frame 415, on the other hand, movable object 401 is located in the upper left portion of the frame. During the period of time between generation of reference frame 415 and current frame 413, therefore, object 401 has moved from the upper left portion of the viewport to the lower right portion of the viewport as a result of the simulation. Macro blocks 405, 407, 409 and 411, therefore, each of which contains a portion of object 401, also have moved during this time from the upper left portion of the viewport to the lower right portion of the viewport.

If a motion estimation algorithm using conventional methods were employed to calculate motion vectors for macro blocks 405, 407, 409 and 411, an extremely large search area surrounding the position of these blocks within current frame 413 would be required to locate the best matching blocks within reference frame 415. Executing such a motion estimation algorithm within such a large search area would consume substantial computer resources.

In accordance with the present invention, however, the position of movable object 401 within reference frame 415 is identified and used as a reference for restricting the search area for blocks 405, 407, 409 and 411 to a much smaller region surrounding the position of object 401. Vertex data for the primitives for the object from the graphics pipeline prior to rendering current frame 413 and reference frame 415 are used to identify this position.

As shown in FIG. 4, the viewport coordinates of vertexes 417, 419, 421 and 423 of object 401 define the outer boundaries and vertexes of a rectangular region 425 within reference frame 415 containing object 401. Vertex 417 defines the maximum y" coordinate for region 425, vertex 419 defines the minimum x" coordinate for region 425, vertex 421 defines the minimum y" coordinate for region 425 and vertex 423 defines the maximum x" coordinate for region 425. The viewport coordinates for the vertexes of region 423, therefore, are (min x", max y"), (min x", min y"), (max x", min y") and (max x", max y").

A uniform expansion of the boundaries of region 425 defines search area 403. For any macro blocks of current frame 413 containing all or part of object 401, the conventional motion estimation algorithm is modified to restrict the search area to search area 403. For macro blocks 405, 407, 409 and 411, therefore, the motion estimation algorithm restricts its search area to area 403. For the macro blocks of current frame 413 not containing a movable object, the motion estimation algorithm calculates the motion vector using a conventional search area surrounding the position of the macro block within current frame 413. The identity and location of movable objects within a current frame and a reference frame are obtained from the vertex data for the primitives corresponding to the objects generated by the graphics pipeline prior to the rasterizing and rendering of the pixel data. These vertex data include the world coordinates for the vertexes of the objects' primitives, the projection plane coordinates for the vertexes of the objects' primitives and the viewport coordinates for the vertexes of the objects' primitives.

Figure 5:
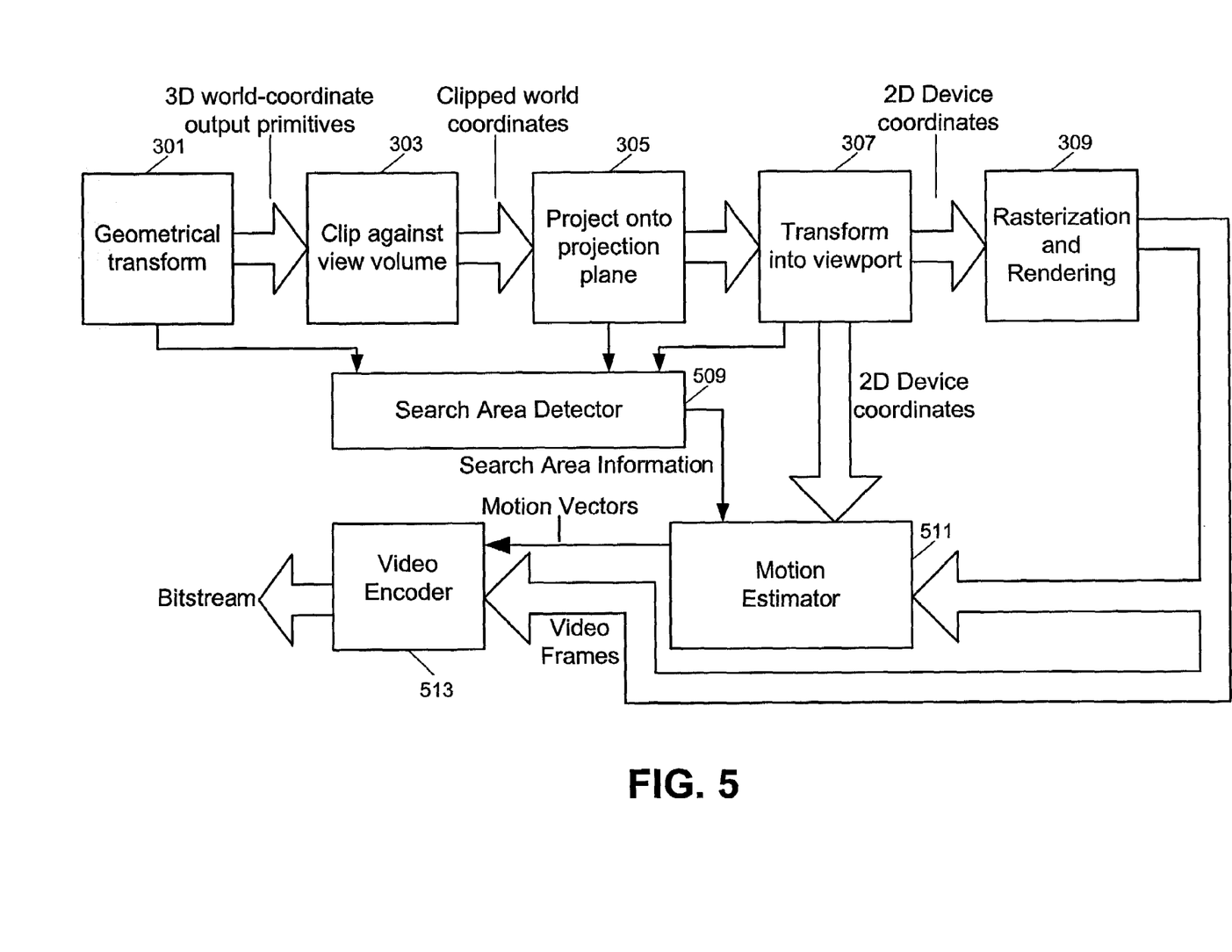
FIG. 5 is a block diagram of a system for encoding video graphics data in accordance with the present invention.

A block diagram of one embodiment of a system for encoding and compressing video graphics data in accordance with the present invention is shown in FIG. 5. Functional blocks 301, 303, 305, 307 and 309 of the graphics pipeline are the same, and perform the same functions, as discussed above in connection with FIG. 3. Video encoder 513 may be an MPEG-1 encoder, an MPEG-2 encoder, an MPEG-4 encoder or any other data compression encoder utilizing temporal redundancy.

Motion estimator 511 receives frames of rendered pixel data from functional block 309, the viewport coordinates for the vertexes of movable objects depicted within these frames from functional block 307 and the viewport coordinates of a search area within a reference frame from search area detector 509. Motion estimator 511 uses this information to calculate motion vectors for the macro blocks of each current frame with respect to a reference frame and transmits these motion vectors to video encoder 513 for use in compressing the current video frames. Motion estimator 511 executes a motion estimation algorithm to calculate these motion vectors, such as a full search algorithm, a hierarchical searching algorithm or a telescopic algorithm, modified in the manner discussed below. Video encoder 513 receives these motion vectors and the rendered video frames from functional block 309 and generates a bit stream of compressed video data for transmission over a network such as a local area network or a wide area network, for example, the Internet, or other transmission network.

Motion estimator 511 examines each macro block of a current frame to be compressed and the viewport coordinates for the vertexes of the movable objects from functional block 307. If the vertex data indicate that a moving object is depicted in whole or in part within a macro block, the search area within the reference frame for the macro block is defined based upon the information from search area detector 509. On the other hand, if the vertex data from functional block 307 indicate that no moving object is depicted within the macro block, then motion estimator 511 defines the search area within the reference frame as an area surrounding the position of the macro block within the current frame based upon conventional methods.

Search area detector 509 receives the transformed three-dimensional world coordinates for the vertexes of all objects modeled within the database of graphics data used to generate the video simulation, the two-dimensional projection plane coordinates for these objects and the two-dimensional viewport coordinates for these objects from, respectively, functional block 301, functional block 305 and functional block 307. Using these data, search area detector 509 generates the viewport coordinates for the vertexes of an appropriate search area surrounding each movable object as discussed above.

Search area detector 509, motion estimator 511 and video encoder 513 may be implemented in hardware, software or any combination of the two. For example, the functions of the search area detector 509, motion estimator 511 and video encoder 513 may be implemented by a programmed processor such as a microprocessor, a hardwired digital circuit, an application specific integrated circuit (ASIC) or other digital circuits or software. These devices may be implemented as integrated circuits on one or more semiconductor chips. The software may be stored in a ROM, EPROM, EEPROM, magnetic disk, optical disk or any other suitable storage medium. The hardware and software may be part of a game machine, server computer, desktop computer, handheld computer, portable computer, settop box or other computing device. The computer system may be a stand-alone device or connected to a network such as the Internet.

The preferred embodiments described above include numerous variations and combinations that are within the spirit and scope of the invention. This description of the preferred embodiments, therefore, should be understood as an illustration of the invention and not as a limitation. The scope of the invention is described below by the following claims.

The invention claimed is:

1. A method for compressing video data representing simulated objects comprising:
   generating in a graphics pipeline, from video graphics data that have not been rendered and provide modeling of simulated objects to be rendered by said graphics pipeline, vertex data corresponding to the modeling of said objects;
   rendering said video graphics data to produce a current frame of pixel data and a reference frame of pixel data;
   based upon said vertex data, defining a search area within said reference frame for calculating a motion vector for a block of pixel data within said current frame.

2. A method as in claim 1, wherein said objects comprise movable objects.

3. A method as in claim 2, wherein said block contains at least a portion of one of said movable objects.

4. A method as in claim 3, further comprising defining said search area based upon the viewport coordinates of vertexes corresponding to said one movable object within said reference frame.

5. A method as in claim 3, wherein said search area surrounds said one movable object within said reference frame.

6. A method as in claim 5, wherein said search area is rectangular in shape.

7. A method as in claim 1, further comprising compressing said current frame based upon said motion vector.

8. A method as in claim 7, wherein said compressing comprises compressing said current frame in accordance with the MPEG format.

9. A method as in claim 2, further comprising defining a second search area for calculating a motion vector for a second block of pixel data within said current frame, said second block containing none of said movable objects and said second search area being defined independently of said vertex data.

10. A method as a claim 1, further comprising in said graphics pipeline performing geometrical transformations upon said video graphics data, clipping said video graphics data against a view volume, projecting said video graphics data onto a projection plane and transforming said video graphics data into a viewport.

11. A method as in claim 1, wherein said video graphics data are associated with a video game.

12. A method as in claim 1, further comprising transmitting said current frame and said reference frame over a network.

13. A method as in claim 12, wherein said network comprises the Internet.

14. A system for compressing video data representing simulated objects comprising:
    means for generating in a graphics pipeline, from video graphics data that have not been rendered and provide modeling of simulated objects to be rendered by said graphics pipeline, vertex data corresponding to the modeling of said objects;
    means for rendering said video graphics data to produce a current frame of pixel data and a reference frame of pixel data;
    based upon said vertex data, means f or defining a search area within said reference frame for calculating a motion vector for a block of pixel data within said current frame.

15. A system as in claim 14, wherein said objects comprise movable objects.

16. A system as in claim 15, wherein said block contains at least a portion of one of said movable objects.

17. A system as in claim 16, further comprising means for defining said search area based upon the viewport coordinates of vertexes corresponding to said one movable object within said reference frame.

18. A system as in claim 16, wherein said search area surrounds said one movable object within said reference frame.

19. A system as in claim 18, wherein said search area is rectangular in shape.

20. A system as in claim 14, further comprising means for compressing said current frame based upon said motion vector.

21. A system as in claim 20, wherein said means for compressing comprises means for compressing said current frame in accordance with the MPEG format.

22. A system as in claim 15, further comprising means for defining a second search area for calculating a motion vector for a second block of pixel data within said current frame, said second block containing none of said movable objects and said second search area being defined independently of said vertex data.

23. A system as a claim 14, further comprising in said graphics pipeline means for performing geometrical transformations upon said video graphics data, means for clipping said video graphics data against a view volume, means for projecting said video graphics data onto a projection plane and means for transforming said video graphics data into a viewport.

24. A system as in claim 14, wherein said video graphics data are associated with a video game.

25. A system as in claim 14, further comprising means for transmitting said current frame and said reference frame over a network.

26. A system as in claim 25, wherein said network comprises the Internet.

27. A system for compressing video data representing simulated objects comprising:
    a first processor adapted to generate in a graphics pipeline, from video graphics data that have not been rendered and provide modeling of simulated objects to be rendered by said graphics pipeline, vertex data corresponding to the modeling of said objects, said first processor being further adapted to render said video graphics data to produce a current frame of pixel data and a reference frame of pixel data;

a second processor adapted to define, based upon said vertex data, a search area within said reference frame for calculating a motion vector for a block of pixel data within said current frame.

28. A system as in claim 27, wherein said objects comprise movable objects.

29. A system as in claim 28, wherein said block contains at least a portion of one of said movable objects.

30. A system as in claim 29, wherein said second processor is further adapted to define said search area based upon the viewport coordinates of vertexes corresponding to said one movable object within said reference frame.

31. A system as in claim 29, wherein said search area surrounds said one movable object within said reference frame.

32. A system as in claim 31, wherein said search area is rectangular in shape.

33. A system as in claim 27, wherein said second processor is further adapted to compress said current frame based upon said motion vector.

34. A system as in claim 33, wherein said second processor is further adapted to compress said current frame in accordance with the MPEG format.

35. A system as in claim 28, wherein said second processor is further adapted to define a second search area for calculating a motion vector for a second block of pixel data within said current frame, said second block containing none of said movable objects and said second search area being defined independently of said vertex data.

36. A system as a claim 27, wherein said first processor is further adapted to perform in said graphics pipeline geometrical transformations upon said video graphics data, to clip in said graphics pipeline said video graphics data against a view volume, to project in said graphics pipeline said video graphics data onto a projection plane and to transform in said graphics pipeline said video graphics data into a viewport.

37. A system as in claim 27, wherein said video graphics data are associated with a video game.

38. A system as in claim 27, wherein said second processor is further adapted to transmit said current frame and said reference frame over a network.

39. A system as in claim 38, wherein said network comprises the Internet.

40. A system as in claim 27, wherein said first processor and said second processor comprise programmed processors executing software stored in a storage medium.

41. A system as in claim 27, wherein said first processor and said second processor comprise application specific integrated circuits.

42. A system as in claim 27, wherein said first processor and said second processor are incorporated into a game machine.

43. A system as in claim 27, wherein said second processor comprises and MPEG encoder.

44. A system as in claim 43, wherein said first processor comprises a programmed processor executing software stored in a storage medium.

45. A system for compressing video data representing simulated objects comprising:

a processor adapted to receive from a graphics pipeline a current frame of pixel data, a reference frame of pixel data and vertex data generated from video graphics data in said pipeline that have not been rendered and provide modeling of simulated objects to be rendered by said graphics pipeline, said processor being further adapted to define, based upon said vertex data, a search area within said reference frame to calculate a motion vector for a block of pixel data within said current frame and to compress said current frame based upon said motion vector.

46. A system as in claim 45, wherein said objects comprise movable objects.

47. A system as in claim 46, wherein said block contains at least a portion of one of said movable objects.

48. A system as in claim 47, wherein said processor is further adapted to define said search area based upon the viewport coordinates of vertexes corresponding to said one movable object within said reference frame.

49. A system as in claim 47, wherein said search area surrounds said one movable object within said reference frame.

50. A system as in claim 49, wherein said search area is rectangular in shape.

51. A system as in claim 45, wherein said processor is further adapted to compress said current frame in accordance with the MPEG format.

52. A system as in claim 46, wherein said processor is further adapted to define a second search area for calculating a motion vector for a second block of pixel data within said current frame, said second block containing none of said movable objects and said second search area being defined independently of said vertex data.

53. A system as in claim 45, wherein said video data are associated with a video game.

54. A system as in claim 45, wherein said processor is further adapted to transmit said current frame and said reference frame over a network.

55. A system as in claim 54, wherein said network comprises the Internet.

56. A system as in claim 45, wherein said processor comprises a programmed processor executing software stored in a storage medium.

57. A system as in claim 45, wherein said processor comprises an application specific integrated circuit.

58. A system as in claim 45, wherein said processor is incorporated into a game machine.

59. A system as in claim 45, wherein said processor comprises and MPEG encoder.

\* \* \* \* \*

UNITED STATES PATENT AND TRADEMARK OFFICE
CERTIFICATE OF CORRECTION

PATENT NO. : 7,038,676 B2
APPLICATION NO. : 10/167328
DATED : May 2, 2006
INVENTOR(S) : Eiji Iwata and Masakazu Suzuoki

It is certified that error appears in the above-identified patent and that said Letters Patent is hereby corrected as shown below:

On the title page, column 1, in the name of the assignee, after "Computer" and before "Inc." it should read --Entertainment--.

Column 7, line 64, delete "a" after "as" and in its place, insert --in--.
Column 8, line 20, after "means" delete "f or" and in its place, insert --for--.
Column 9, line 35, after "as" delete "a" and in its place, insert --in--.
Column 10, line 2, after "comprises" delete "and" and in its place, insert --an--.
Column 10, line 56, after "comprises" delete "and" and in its place, insert --an--.

Signed and Sealed this

Nineteenth Day of September, 2006

JON W. DUDAS
*Director of the United States Patent and Trademark Office*